(12) United States Patent
Lindoff et al.

(10) Patent No.: US 8,781,400 B2
(45) Date of Patent: Jul. 15, 2014

(54) METHOD AND APPARATUS FOR REDUCING CO-CHANNEL INTERFERENCE

(75) Inventors: Bengt Lindoff, Bjärred (SE); Arne Simonsson, Gammelstad (SE); Bo Hagerman, Tyresö (SE); Stefan Parkvall, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 273 days.

(21) Appl. No.: 13/172,906

(22) Filed: Jun. 30, 2011

(65) Prior Publication Data
US 2013/0005269 A1    Jan. 3, 2013

(51) Int. Cl.
*H04B 15/00* (2006.01)

(52) U.S. Cl.
USPC .......... 455/62; 455/63.1; 455/67.11; 370/329

(58) Field of Classification Search
CPC ......... H04B 17/0057; H04W 36/0044; H04W 36/0083; H04W 52/243
USPC ......... 455/62, 63.1, 67.11, 179.1, 509, 166.1, 455/166.2, 150.1, 154.1; 370/329, 248, 341
See application file for complete search history.

(56) References Cited

U.S. PATENT DOCUMENTS

| | | | | |
|---|---|---|---|---|
| 5,365,516 A | * | 11/1994 | Jandrell | 370/335 |
| 5,410,737 A | * | 4/1995 | Jones | 455/454 |
| 5,696,903 A | * | 12/1997 | Mahany | 709/228 |
| 5,864,764 A | * | 1/1999 | Thro et al. | 455/561 |
| 5,973,643 A | * | 10/1999 | Hawkes et al. | 342/457 |
| 6,898,431 B1 | * | 5/2005 | Peele | 455/453 |
| 7,016,319 B2 | * | 3/2006 | Baum et al. | 370/329 |
| 7,184,777 B2 | * | 2/2007 | Diener et al. | 455/456.1 |
| 7,760,649 B2 | * | 7/2010 | Song | 370/238 |
| 8,068,826 B2 | * | 11/2011 | Kuffner et al. | 455/423 |
| 2004/0160916 A1 | * | 8/2004 | Vukovic et al. | 370/332 |
| 2004/0185864 A1 | * | 9/2004 | Balachandran et al. | 455/452.2 |
| 2008/0075010 A1 | * | 3/2008 | Song | 370/238 |
| 2010/0080180 A1 | * | 4/2010 | Tortora | 370/329 |
| 2010/0210214 A1 | * | 8/2010 | Pawar et al. | 455/63.1 |
| 2011/0081865 A1 | | 4/2011 | Xiao et al. | |
| 2012/0236731 A1 | * | 9/2012 | Beaudin | 370/248 |

OTHER PUBLICATIONS

International Search Report and Written Opinion, PCT/EP2012/062006, Sep. 17, 2012.
Akyildiz, I. et al, "The Evolution to 4G Cellular Systems: LTE-Advanced", Physical Communication (2010); pp. 217-244; sections 3.2, 3.3.3, 4.5.2, 5. Figures 9, 10, 13 and 20-24.
Astely, D. et al, "TD-LTE-The Radi-Access Solution for IMT-Advanced/TDD", Communications and Networking in China (Chinacom), 2010 5th Int'l ICST Conference, IEEE Aug. 25, 2010; pp. 1-5, sections III.C-IV.B; Figures 2,3.

\* cited by examiner

*Primary Examiner* — Minh D Dao
(74) *Attorney, Agent, or Firm* — Patent Portfolio Builders PLLC

(57) ABSTRACT

A method for providing co-channel interference information by a network node includes receiving information for at least one user equipment (UE) connected to an adjacent network node, determining a co-channel interference list for user equipment (UE) connected to the network node wherein the co-channel interference list is based on the received information and transmitting the co-channel interference list to a UE connected to the network node.

12 Claims, 6 Drawing Sheets

METHOD AND APPARATUS FOR REDUCING CO-CHANNEL INTERFERENCE

TECHNICAL FIELD

The invention relates generally to a mobile terminal, and more particularly, to methods and apparatus for improving the terminal performance.

BACKGROUND

Forthcoming releases of the 3GPP LTE ($3^{rd}$ Generation Partnership Project Long Term Evolution) and HSPA (High Speed Packet Access) standard facilitate dual-carrier operation. In dual carrier operation, the user equipment (UE) can transmit and receive on multiple system carriers simultaneously. A dual carrier system 100 is illustrated in FIG. 1. A dual carrier capable UE 112 can transmit to, and receive from, serving cell 110 on multiple system carriers (f1 and f2) simultaneously. A dual carrier system can increase the maximal throughput. Throughput is roughly proportional to N where N is the number of carriers. Therefore, the throughput in a dual carrier system can increase by a factor of two (from 100 Mb/s to 200 Mb/s for example). A dual-carrier (or dual-cell) mobile terminal (or UE) for use in the dual carrier system needs the ability to process two downlinks (and/or two uplinks) at the same time. Typically, this means that baseband processing capability of a dual-carrier mobile terminal (such as channel estimation/decoding, etc.) is double that of a single-carrier mobile terminal.

The co-ordination of transmission from antennas positioned in different sites have also evolved in these standards such as advanced Inter-Cell Interference Co-ordination (ICIC), Co-ordinated MultiPoint (CoMP) transmission and the introduction of Remote Radio Units (RRU). These techniques enable fast co-ordinated transmissions from several antenna positions including beam forming and nulling. With nulling, interference can be strongly reduced to a specific UE. In coherent CoMP transmissions, the nulling gain is included in the algorithm of selecting co-scheduled mobiles and antenna pre-coding weights.

In order to increase capacity, MU-MIMO (Multi User Multiple Input Multiple Output) is used. In MU-MIMO, the radio resources are reused by transmitting on the same time and frequency to multiple UEs.

Dual-carrier (dual-cell) LTE/HSPA will probably be applied only in hot spot regions and also is only needed for very high throughput scenarios such as when single carrier transmission is insufficient. Therefore, in many use cases, where a single carrier is used, the baseband processing is not fully utilized in the mobile terminal. According to a common scenario in cellular systems, as illustrated in FIG. 2, a terminal 212 is at the cell border between two cells. One of these cells is the serving cell (SC) 210 and the other cell is a neighboring cell (NC) (or multiple neighboring cells) 220. A signal S that is being communicated between serving cell 210 and UE 212 is being subjected to interference I from neighboring cell 220. In such a scenario, the signal-interference-ratio (SI or SIR or carrier-to-interference ratio, CA) is approximately 0 dB (SI≈0). As a result, full downlink (DL) (and uplink, UL) throughput cannot be achieved. However, in these scenarios, the extra processing power can be used for detecting and cancelling the interfering signals, I.

A terminal connected to a cell receives control information on the physical downlink control channel (PDCCH). This information can be utilized by the terminal to determine whether it (i.e. the terminal) is scheduled in the downlink in the current subframe. The terminal attempts to blindly decode multiple PDCCHs in each subframe. If the decoding is successful, it (i.e. decoded information) contains the parameters necessary to receive the data transmission. PDCCH also provides information about resource blocks and modulation and coding used for data transmission (i.e. for data transmitted on the physical downlink shared channel, PDSCH).

However, a significant problem that is encountered in the cancellation scenario is obtaining information about the scheduled users. This information (about scheduled users) is needed to receive the signal from the neighboring cell which can be used in the cancellation process. Blind decoding of the PDCCHs transmitted in the neighboring cell is typically not feasible as the terminal (that is decoding the PDCCHs) is unaware of which terminals are connected to the neighboring cells. This makes the cancelling process significantly more complex.

There exists a need therefore for a method and apparatus for improving the blind PDCCH decoding in the mobile terminal in order to enable the terminal to do advanced interference cancelling of signals transmitted from neighboring cells to corresponding neighboring mobile terminals.

Furthermore, when transmission schemes such as beam forming, nulling, MU-MIMO or CoMP is used, it is desirable to take the UE interference cancellation capability into account when selecting pre-coding as well as to select the group of UEs to co-schedule on the same radio resources.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In exemplary embodiments, the foregoing and other objects are achieved in methods, systems, and apparatuses for utilizing information received by a network node from adjacent network node(s).

According to an exemplary embodiment, a method of providing co-channel interference information by a network node is disclosed. The method includes receiving information for at least one user equipment (UE) connected to an adjacent network node, determining a co-channel interference list for user equipment (UE) connected to the network node wherein the co-channel interference list is based on the received information and transmitting the co-channel interference list to a UE connected to the network node.

According to another exemplary embodiment, a method of improving reception performance of a user equipment connected to a serving cell is disclosed. The method includes detecting adjacent cells, measuring a signal strength value of the detected cells, storing the detected cells and corresponding measured signal strength value, receiving a co-channel cell interference list, comparing an identity of cells in the received list with an identity of the stored cells to identify matching cells and utilizing the identity of the matched cells to improve a decoding performance of data received by the user equipment.

BRIEF DESCRIPTION OF THE DRAWINGS

The objects and advantages of the invention will be understood by reading the following detailed description in conjunction with the drawings in which.

DETAILED DESCRIPTION

Figure 1:
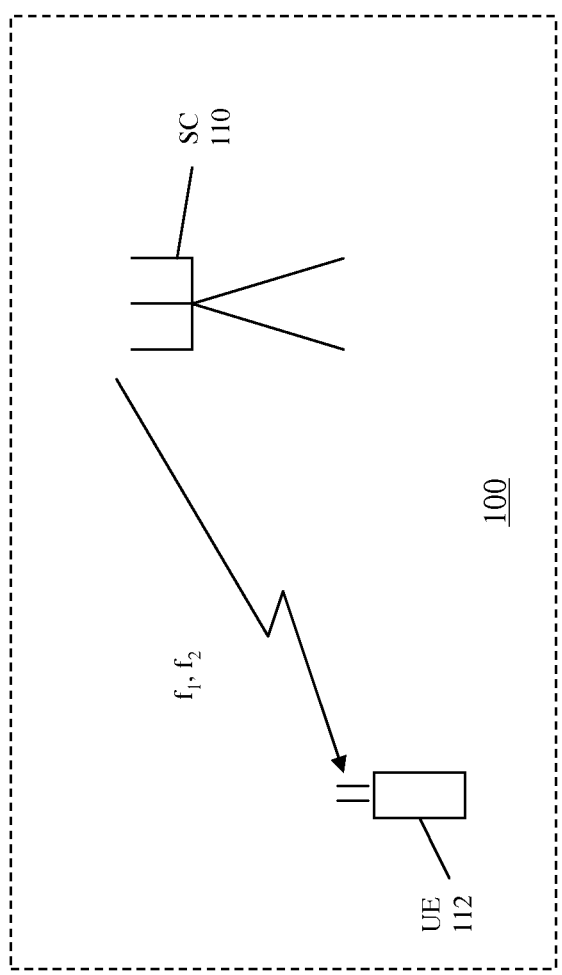
FIG. 1 illustrates a dual carrier system with dual carrier terminal.
Figure 2:
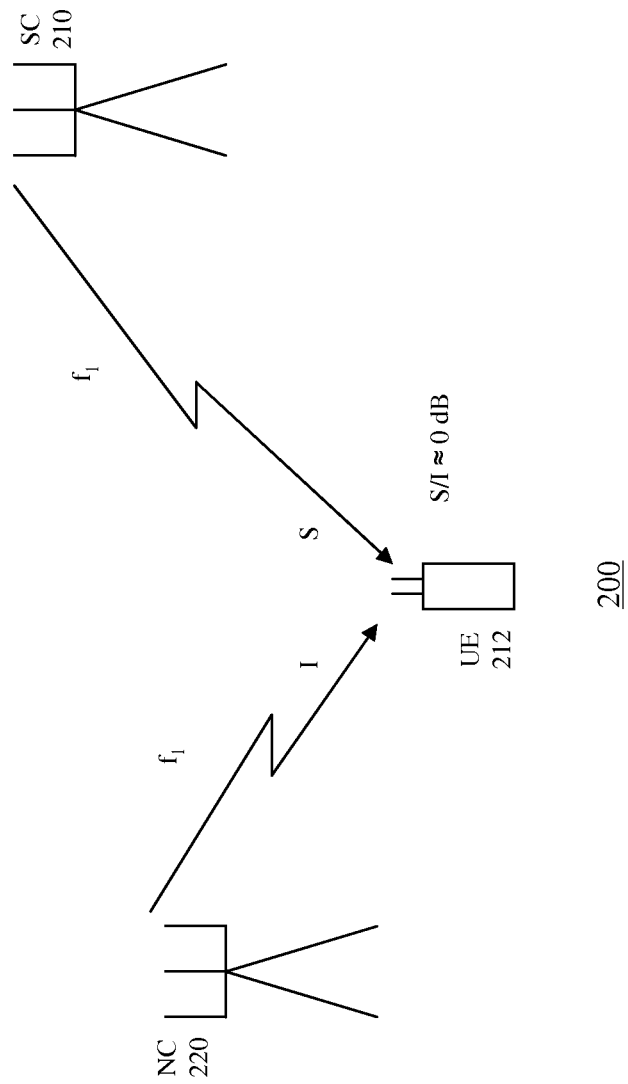
FIG. 2 illustrates a single carrier system with dual carrier terminal.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors).

Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

The serving cell (SC) for a particular UE or terminal can receive information from the network about other (currently active) UEs or terminals that are expected to be (co-channel) interferers to the particular UE. This information may, for example, be in the form of radio network temporary identifier (RNTI) of those terminals. Serving eNodeB can have information about (major) interfering transmissions from MU-MIMO scheduling or eNodeB control of RRU for example. The interfering transmission information can also be exchanged between neighboring cells over the X2 interface.

The serving cell can use the interference transmission information to create a list of the UEs that can contribute interfering transmissions. The list of UEs contributing the interfering transmissions may be referred to as a co-channel interference list. If the interference is from UEs in neighboring cells, this list can also be referred to as a UE neighbor list (i.e. the UE neighbour list is a particular example of a co-channel interference list). This list can be sent to the UE(s) (being served by the serving cell). These UE(s) can then use this information in the interference cancelling procedure by, for example, reducing the PDCCH search space on neighboring cell(s) as well as on the serving cell.

In MU-MIMO, the interfering UE ("interferer") is connected to the same cell as the "interfered" UE (an interfered UE may be the UE that is interfered with by the interfering UE). In this case, the interfering UE originates from the serving cell. The UE co-channel interference list can, for example, be sent to the UE or terminal via Radio Resource Control (RRC) signalling, Media Access Control (MAC) signalling or the like. The list can be updated periodically such as every 100 ms or every second for example. The list can also be included in the scheduling information addressing each Transmission Time Interval (TTI) co-channel scheduling.

The co-channel interferer list provided to different UEs that are connected to a particular (serving) cell can vary (from each other) based on at least one of the information transferred from neighboring cells and knowledge about the different UEs in the serving cell such as their position for example. The list could also be in one form (i.e. an identical list) that is broadcast to all terminals operating within the serving cell. In some embodiments, some of the UEs connected to a particular serving cell may receive an identical list while others may receive variable lists.

Figure 3:
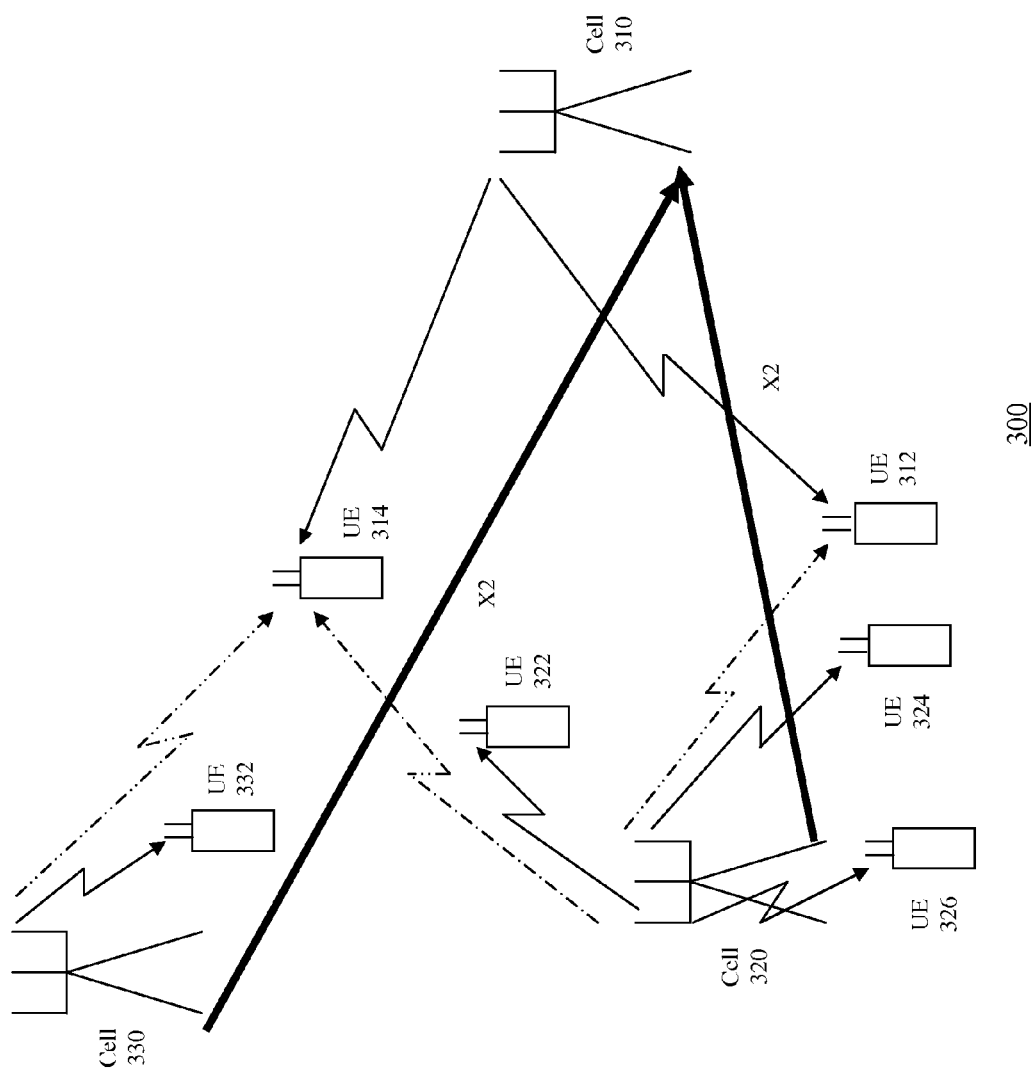
FIG. 3 illustrates a cellular system in accordance with exemplary embodiments.

A cellular system in accordance with exemplary embodiments is illustrated in FIG. 3. Cellular system 300 may include three cells 310, 320 and 330. Cells 310, 320 and 330 may also be referred to as nodes or network nodes. A plurality of UEs may be operating within cellular system 300. In the embodiment of FIG. 3, six UEs are included—UEs 312, 314, 322, 324, 326 and 332. Each of UEs 312 and 314 may be connected to (with) cell 310. For UEs 312 and 314, cell 310 may be the serving cell (SC) and one or both of 320 and 330 may be the neighboring cells (NC). For UEs 322, 324 and 326, cell 320 may be the serving cell and one or both of cells 310 and 330 may be the neighboring cells. For UE 332, cell 330 may be the serving cell and one or both of cells 310 and 320 may be the neighboring cells. The dashed lines may represent interference to UE 312 from cell 320 and to UE 314 from cells 320 and 330.

UEs 312 and/or 314 as illustrated may experience interference from neighboring cells. Cells 320 and 330 may send or transmit information about their connected UEs (i.e. 322, 324, 326 and 332) to cell 310. This information may be signalled via the X2 interface for example. Cell 310 may compile a UE co-channel interference list based on the information received from cells 320 and 330 and on its knowledge about the position of UEs 312 and 314. This list may then be sent to UEs 312 and 314.

In system 300 of FIG. 3, the list compiled by cell 310 may include the RNTIs (and cell id) for UEs 322, 324 and 326 that are connected to cell 320 and the RNTI (and cell id) for UE 332 that is connected to cell 330. Cell 310 may send (i.e. broadcast) a list identifying UEs 322, 324 and 326 as interferers (or, potential interferes) to UE 312 and a list identifying UEs 322, 324, 326 and 332 as interferers may be sent to UE 314. This is based, partly on, location of UEs 312 and 314 as known to cell 310. UEs 312 and 314 may each receive dedicated RRC signalling messages from cell 310 containing or including the list.

In some embodiments, signal power measurements, such as the handover Reference Signal Received Power (RSRP) from the connected UE, may also be used to limit the co-channel interference list. Radio network information (such as RSRP) of the interfered UEs may be a more precise or accurate indicator of potential interference from neighboring cells than geographical position. RSRP measurements on neighboring cells are available from handover measurements made by each UE and reported to the serving network node. The interference list may be reduced to neighboring cells having a RSRP above a certain pre-determined threshold indicating a close neighbor and hence an increased potential for interference. In cellular system 300 of FIG. 3, for example, the handover measurements may be obtained by cell 310 from UEs 312 and 314 (i.e. all UEs connected to cell 310.

The submission of an identical list to all UEs (connected to the SC) may be implemented easily in the network while requiring a larger search space in the UEs. The submission of a more specific list to each UE (connected to the SC) may require greater knowledge in the network node with a reduced search space in the decoding in the UE.

In MU-MIMO, several UEs can be scheduled from the same node utilizing different pre-coding (i.e. orthogonal transmission between users). The UEs can, despite orthogonal transmissions, interfere with each other due to imperfections in transmission, reception and channel estimations. The interfering UE can be on the same (serving) cell as the interfered UE. In such a scenario, the serving cell has knowledge of co-ordinated scheduling. The same node may schedule all UEs and can provide updates (if any) of co-channel interference list during every scheduling instant (i.e. each TTI).

Referring to FIG. 3, UEs 312 and 314 are scheduled on the same resource (MU-MIMO transmission on same resource block, time and frequency). UE 312 may receive information about UE 314 in the MAC scheduling message; similarly, UE 314 may receive information about UE 312. Similar grouping of orthogonal UEs can be applied also for CoMP but in this case they can be effectively nulled, thus significantly reducing the interferers. Depending on the expected nulling impact, the UEs can be included or excluded from the list. Also, the possibility to achieve effective interference cancellation in the UE can be used the other way around for CoMP. By including specific UEs in the list, they can coherently be co-scheduled and thereby grouped for CoMP scheduling.

Figure 4:
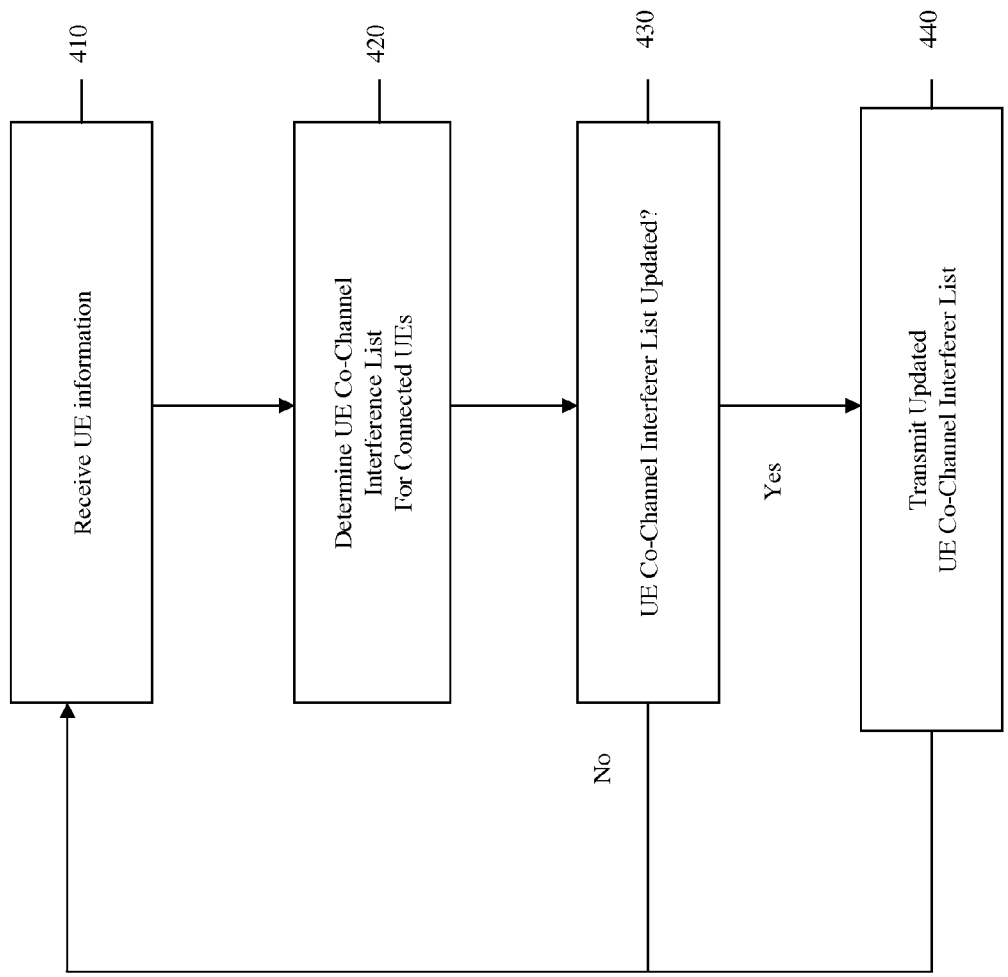
FIG. 4 illustrates a method in accordance with exemplary embodiments.

A method in accordance with exemplary embodiments that may be implemented in a network node (such as an eNodeB for example) is illustrated in FIG. 4. The network node may obtain information on potential co-channel interfering UEs at 410. This information may be for different neighboring cells or within the same cell in MU-MIMO scheduling. The information may include physical layer UE information such as the RNTI or radio network information such as RSRP for example. If the received information is RNTI for UEs from neighboring cells, the corresponding cell id may also be received.

This information may be utilized to determine the scrambling of the CRC in the PDCCH of UEs currently actively connected to the cell. For instance, all UEs in RRC_connected, that is in non-DRX mode, or in short DRX mode could be included in the UE neighbor list. The co-channel interference list may be updated on a regular basis and neighboring cell information may be sent over the X2 interface every 100-1000 ms for example.

The serving cell may compile the UE co-channel interference list to be transmitted to one or more UEs connected to the serving cell at 420. As describe above with respect to system 300 of FIG. 3, there could be one UE neighbor list (the aggregated co-channel interference list received from all neighbors) that may be sent to all UEs connected to the serving cell or dedicated lists transmitted to different subsets of the UEs connected to the serving cell. A control unit may determine whether any changes have been made to the co-channel interference list at 430. If a change has been made ("YES"), the new (updated) list may be transmitted to the UEs affected by the changes at 440. The transmission may utilize, but is not limited to, for example, RRC signalling, MAC scheduling or the like. If no changes have been made ("NO"), the serving cell may continue to receive, or await reception, of UE information.

Figure 5:
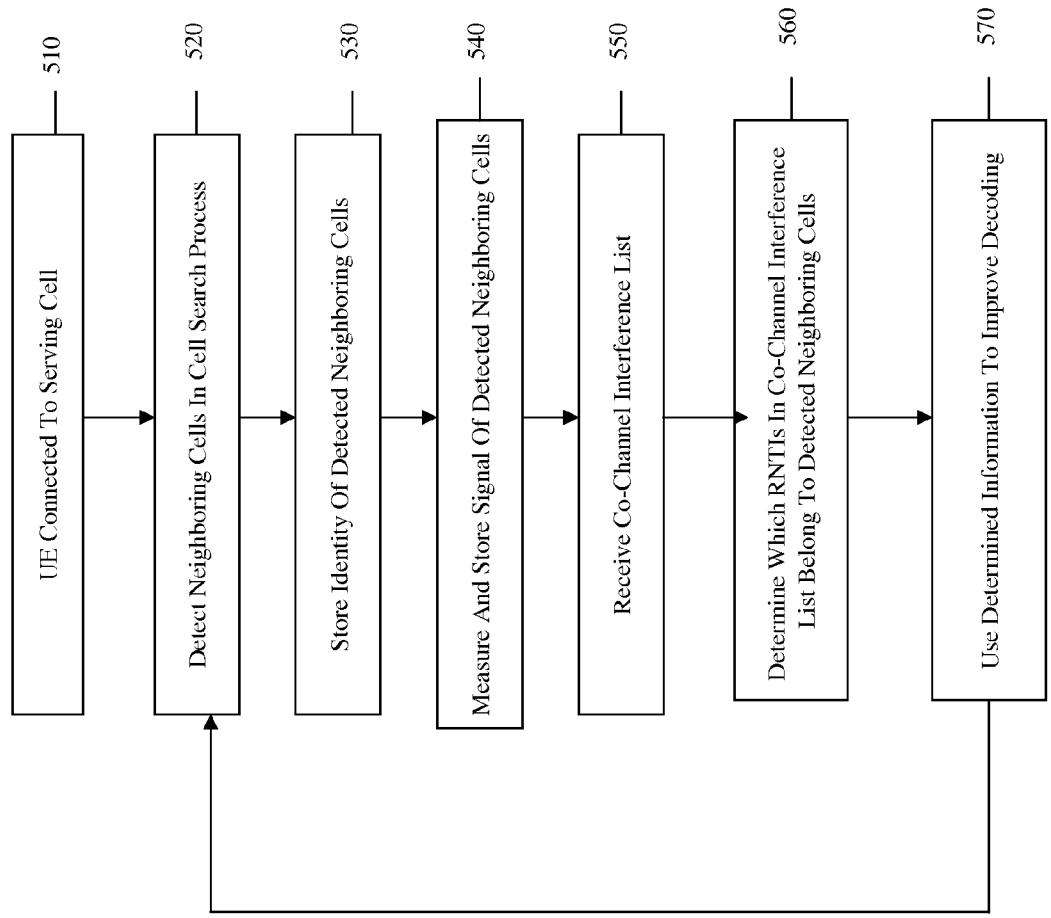
FIG. 5 illustrates a method in accordance with exemplary embodiments.

A method in accordance with exemplary embodiments that may be implemented in a mobile terminal (or UE) is illustrated in FIG. 5. The UE may be connected to a (serving) cell at 510. The UE may, at a pre-determined interval, perform a cell search to identify or detect suitable (neighboring) cells for a handover at 520. The identity of the cell(s) may be stored at 530. Signal measurements (RSRP for example) may be made for the detected cell(s) at a pre-determined interval at 540. The measurements may also be stored. The UE may receive a UE co-channel interference list (including RNTI) from the serving cell at 550. The UE may determine which of the RNTIs (received from the serving cell) belong to the detected (and stored) neighboring cell list at 560. Typically, if a UE detects a neighboring cell, data scheduled to UEs in that neighboring cell could potentially interfere with data scheduled from the serving cell to the UE.

All relevant RNTIs (those belonging to the cells in the detected neighbor list) may be provided to a decoding unit that uses the information to improve the decoding performance of packets transmitted to the UE at 570. In LTE for example, the UE could use the RNTI and the knowledge of the neighboring cell identification (NCI) to de-scramble and decode the PDCCH. Knowledge of the RNTI used by UEs in neighboring cells makes it possible to determine scheduled PDSCH resource block to that "neighbor" UE that can interfere with scheduled resource blocks (RBs) to the (connected) UE. Such knowledge may be used in an interference cancelling receiver.

Figure 6:
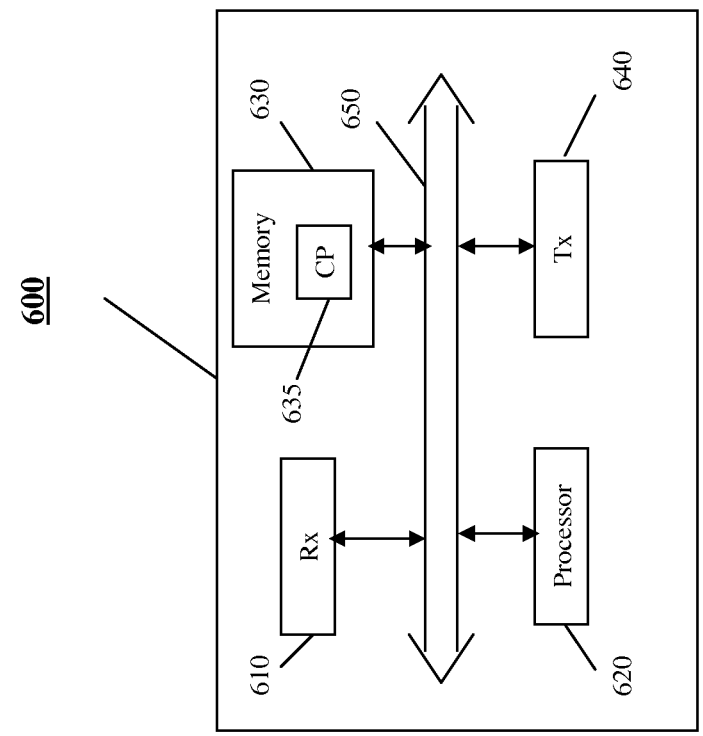
FIG. 6 illustrates a network node in accordance with exemplary embodiments.

Exemplary embodiments as described above may be implemented in a network node. A network node 600 is illustrated in FIG. 6. Cell 310 of FIG. 3 may be a network node. Network node 600 may include, inter alia, a receiving means 610, a processor 620, a computer readable medium 630 in the form of memory and a transmitting means 640. The receiving means and the transmitting means may also be referred to as a transceiver or a communication interface. The transceiver or the communication interface may include separate receiving and transmitting modules.

Receiving means 610 may receive information from an adjacent node (such as cell 320 of FIG. 3) for example. Processor 620 may determine a co-channel interference list based on the received information. The received information and the co-channel interference list may be stored in memory 630. Transmitting means 640 may selectively transmit the co-channel interference list to a corresponding UE connected to the network node. Receiving means 610, processor 620, memory 630 and transmitting means 640 may be interconnected via a bus 650.

In one embodiment, in order for the processor 620 to be able to perform the steps illustrated in FIG. 4, memory 630 comprises a computer program (CP) 635 with computer program modules which when run by the processor 620 causes the network node 600 to perform all or some of the steps illustrated in FIG. 4.

Figure 7:
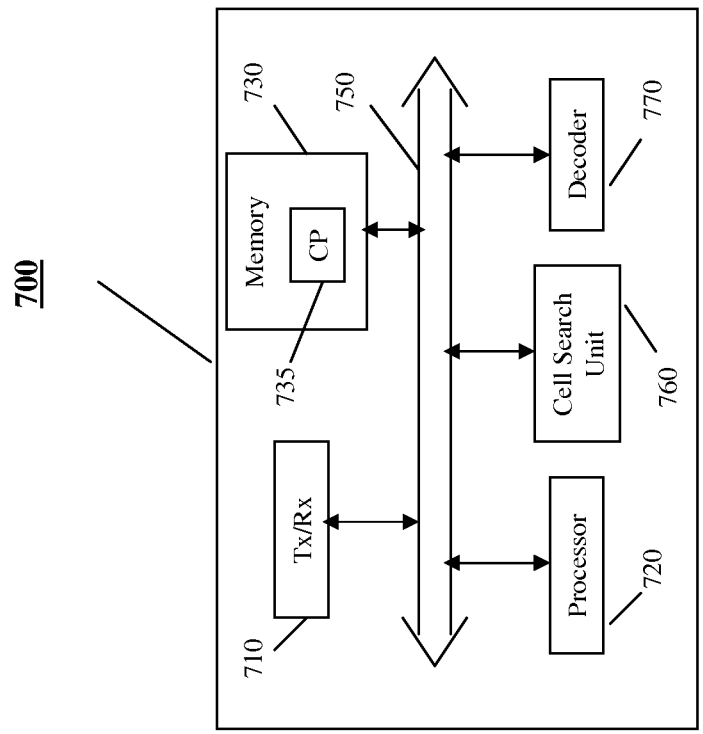
FIG. 7 illustrates a user terminal in accordance with exemplary embodiments.

A user equipment or a mobile terminal may facilitate the method as described above with reference to FIG. 5. A user equipment 700 is illustrated in FIG. 7. Such a user equipment may be a mobile telephone or a portable computing device for example. User equipment 700 may include, inter alia, transceiver 710, processor 720, computer readable medium 730 in the form of a memory, cell search unit 760 and decoder 770 that are interconnected via a bus 750. Transceiver 710 may enable connection to a serving cell (a network node). The transceiver may be referred to as a communication interface. It may also include separate receiving and transmitting modules.

Cell search unit 760 may detect neighboring cells (nodes) in the cell search process. The identity of the detected cells may be stored in memory 730. Processor 720 may measure signal strength of the detected cells which may also be stored in memory 730. Transceiver 710 may receive the co-channel interference list from the serving cell. Processor 720 may determine which UEs in the co-channel interference list belong to the detected neighboring cells. Decoding unit 770 may use this information to improve decoding of data packets received at the mobile terminal.

In one embodiment, in order for the processor 720 to be able to perform the steps illustrated in FIG. 5, the memory comprises a computer program (CP) 735 with computer program modules which when run by the processor 720 causes the mobile communication device to perform all or some of the steps illustrated in FIG. 5.

The memory 630 of network node 600 (and 730 of user equipment 700) may for example be a flash memory, a RAM (Random-access memory) ROM (Read-Only Memory) or an EEPROM (Electrically Erasable Programmable ROM), and the computer program modules described above could in alternative embodiments be distributed on additional memories (not shown) in the network node 600 (and user equipment 700). The processor may not only be a single CPU (Central processing unit), but could comprise two or more processing units in network node 600 (and user equipment 700). For example, the processor may include general purpose microprocessors, instruction set processors and/or related chips sets and/or special purpose microprocessors such as ASICs (Application Specific Integrated Circuit). The processor may also comprise board memory for caching purposes.

Exemplary methods as described herein can be used as an alternative to, or in combination with, dedicated co-channel interference lists if preset semi-persistent scheduling is performed to certain UEs and/or if Multimedia Broadcast and Multicast Services (MBMS) type of broadcasting is applied.

By implementing exemplary embodiments as described herein, the UE or terminal can reduce the search spaces in the PDCCH decoding of neighboring cells. The detection rate of interferers can be improved along with the interference cancelling success rate leading to a higher link throughput and increased system capacity.

Furthermore, with more network controlled interference cancellation in the UE, the combination of nulling and cancellation can be achieved in a more efficient manner. The resource allocation can also be optimized as a result of exemplary performance enhancing methods as descried herein.

While exemplary embodiments have been discussed in terms of LTE, they may be equally applicable for HSPA as well. The RNTI along with NCI provides sufficient information to decode the High Speed Shared Control Channel (HS-SCCH) from neighboring cells and therefore, knowledge of channelization codes etc. that could potentially interfere with reception of HS-PDSCH data to the UE.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of providing co-channel interference information by a network node, the method comprising:
   receiving information for at least one user equipment (UE) connected to an adjacent network node;
   determining a co-channel interference list for user equipment (UE) connected to the network node wherein the co-channel interference list is based on the received information; and
   transmitting the co-channel interference list to a UE connected to the network node.

2. The method of claim 1, further comprising:
   determining if the co-channel interference list has been updated; and
   transmitting the co-channel interference list if it has been updated.

3. The method of claim 1, further comprising:
   utilizing position information of a UE connected to the network node in determining the co-channel interference list.

4. The method of claim 1, wherein the received information is a radio network temporary identifier (RNTI).

5. The method of claim 1, further comprising:
   receiving a reference signal received power (RSRP) value from a user equipment connected to the network node.

6. The method of claim 5, further comprising:
   removing channels from the co-channel interference list for which the RSRP is below a pre-determined threshold.

7. The method of claim 1, wherein the co-channel interference list is transmitted via a radio resource control (RRC) signalling message.

8. The method of claim 1, wherein the co-channel interference list is transmitted via a media access control (MAC) signalling message.

9. The method of claim 1, wherein an identical co-channel interference list is transmitted to UEs connected to the network node.

10. The method of claim 1, wherein the co-channel interference list transmitted to UEs connected to the network node is specific to each receiving UE.

11. A network node comprising:
   a receiving means for receiving information from an adjacent node wherein the received information relates to user equipment connected to the adjacent node;
   a processor for determining a co-channel interference list based on the received information;
   a memory for storing the received user equipment information and the co-channel interference list; and
   a transmitting means for transmitting the co-channel interference list to a UE connected to the network node.

12. A computer program comprising computer readable program modules which when run on a network node causes the network node to:
   receive information for at least one active user equipment (UE) connected to an adjacent network node;
   determine a co-channel interference list for user equipment (UE) connected to the network node wherein the co-channel interference list is based on the received information; and
   transmit the co-channel interference list to a UE connected to the network node.

* * * * *

UNITED STATES PATENT AND TRADEMARK OFFICE
CERTIFICATE OF CORRECTION

| | | |
|---|---|---|
| PATENT NO. | : 8,781,400 B2 | Page 1 of 1 |
| APPLICATION NO. | : 13/172906 | |
| DATED | : July 15, 2014 | |
| INVENTOR(S) | : Lindoff et al. | |

It is certified that error appears in the above-identified patent and that said Letters Patent is hereby corrected as shown below:

In the Specification

In Column 1, Line 59, delete "CA)" and insert -- C/I) --, therefor.

In Column 7, Line 51, delete "descried" and insert -- described --, therefor.

Signed and Sealed this
Twelfth Day of May, 2015

Michelle K. Lee
*Director of the United States Patent and Trademark Office*